(12) United States Patent
Palos De Gouvea et al.

(10) Patent No.: US 11,385,912 B2
(45) Date of Patent: Jul. 12, 2022

(54) SYSTEM TO ENABLE A FULL DESKTOP EXPERIENCE BASED ON A MOBILE DEVICE

(71) Applicant: SAMSUNG ELETRÔNICA DA AMAZÔNIA LTDA., São Paulo (BR)

(72) Inventors: Romeu Palos De Gouvea, Campinas (BR); Éderson Marcos Ferreira, Campinas (BR)

(73) Assignee: SAMSUNG ELETRONICA DA AMAZONIA, LTDA., Campinas (BR)

( * ) Notice: Subject to any disclaimer, the term of this patent is extended or adjusted under 35 U.S.C. 154(b) by 609 days.

(21) Appl. No.: 16/380,382

(22) Filed: Apr. 10, 2019

(65) Prior Publication Data
US 2020/0225965 A1 Jul. 16, 2020

(51) Int. Cl.
G06F 9/451 (2018.01)
G06F 9/455 (2018.01)
G06F 21/62 (2013.01)
H04B 1/3827 (2015.01)

(52) U.S. Cl.
CPC .......... *G06F 9/452* (2018.02); *G06F 9/45529* (2013.01); *G06F 21/6236* (2013.01); *H04B 1/3833* (2013.01)

(58) Field of Classification Search
None
See application file for complete search history.

(56) References Cited

U.S. PATENT DOCUMENTS

| | | | |
|---|---|---|---|
| 9,152,582 B2* | 10/2015 | Reeves | G06F 9/44505 |
| 10,002,113 B2* | 6/2018 | Glover | G06F 40/134 |
| 10,225,287 B2* | 3/2019 | Aamir | G06F 11/3476 |
| 2012/0081353 A1* | 4/2012 | Yusupov | G09G 5/14 |
| | | | 345/418 |
| 2012/0084792 A1* | 4/2012 | Benedek | G06F 9/544 |
| | | | 719/313 |
| 2012/0084798 A1* | 4/2012 | Reeves | G09G 5/14 |
| | | | 719/319 |
| 2013/0174154 A1* | 7/2013 | Poore | G06F 9/45504 |
| | | | 718/1 |
| 2015/0081764 A1* | 3/2015 | Zhao | H04L 67/08 |
| | | | 709/203 |
| 2015/0111612 A1* | 4/2015 | Yaghmour | H04M 1/7246 |
| | | | 455/557 |
| 2017/0220335 A1* | 8/2017 | Pink | G06F 8/61 |

* cited by examiner

*Primary Examiner* — Isaac Tuku Tecklu

(57) ABSTRACT

A system to enable a full Desktop Experience based on a mobile device. The system includes a Linux kernel and a Linux distribution, wherein a mobile operating system, packaged on a virtual container, is running on top of a standard Linux distribution, or wherein desktop and mobile operating systems run on their own Virtual container isolated from each other.

6 Claims, 4 Drawing Sheets

SYSTEM TO ENABLE A FULL DESKTOP EXPERIENCE BASED ON A MOBILE DEVICE

CROSS-REFERENCE TO RELATED APPLICATION

This application claims the priority benefit of Brazilian Patent Application No. 10 2019 000921 7, filed on Jan. 16, 2019, in the Brazilian Intellectual Property Office, the disclosure of which is incorporated herein by reference.

TECHNICAL FIELD

The present invention relates to a system to enable full desktop experience running a regular Linux OS distribution with all its capabilities alongside with a Mobile OS.

BACKGROUND OF THE INVENTION

The system of the present invention allows user to virtually carry with him and use his desktop environment anywhere, by proposing a system to enable a desktop experience based on a smartphone device, when connected to a display (e.g. monitor or TV). Moreover, the present system overcomes the prior art (e.g. Samsung Dex) resource limitations: lack of advanced hardware controls, restricted system user's permissions and resource management constraints.

The current invention is of particular interest for mobile device companies by converging into a single pocketable device the mobile phone and the desktop/laptop functions.

Samsung is also developing a solution called Linux on Galaxy that will run a Linux distribution inside the Dex interface. The problem of Linux on Galaxy solution consists in that the customer is impacted by Android limitations, such as, permissions control, single user/group per application, kernel limitations, etc. The present invention proposes the inverted architecture, since the Linux Kernel is more permissive and gives the user more control over the system. The idea is running the Mobile OS on top of the Linux Kernel, thus, not limiting the user's desktop experience.

The present invention can also be used to add the full desktop experience to different classes of devices (Smartphones, tablets, phablets and so on). The connected display, can be a monitor/TV in a dock station or some remote casting device such as Amazon Fire or Chrome Cast.

The following patent documents and solutions already available on the market which approximate to the present invention are listed below.

Samsung Dex is a device that extends the functionality to allow desktop-like functionality by connecting a keyboard, mouse, and monitor. (https://en.wikipedia.org/wiki/Samsung_DeX).

Docker provides the ability to package and run an application in a loosely isolated environment called a container. The isolation and security allow the user to run many containers simultaneously on a given host. Containers are lightweight because they don't need the extra load of a hypervisor but run directly within the host machine's kernel. It means that the user can run more containers on a given hardware combination than if he was using virtual machines. The user can even run Docker containers within host machines that are actually virtual machines (available at website https://docs.docker.com/engine/docker-overview/).

Namespaces are a feature of the Linux kernel that partitions kernel resources such that one set of processes sees one set of resources while another set of processes sees a different set of resources. The feature works by having the same name space for these resources in the various sets of processes, but those names referring to distinct resources. Examples of resource names that can exist in multiple spaces, so that the named resources are partitioned, are process IDs, hostnames, user IDs, file names, and some names associated with network access, and interprocess communication (available at the website https://en.wikipedia.org/wiki/Linux namespaces).

Union Files Systems: Union is a file system service for Linux, FreeBSD and NetBSD which implements a union mount for other file systems. It allows files and directories of separate file systems, known as branches, to be transparently overlaid, forming a single coherent file system. Contents of directories which have the same path within the merged branches will be seen together in a single merged directory, within the new, virtual file system. (available at the website https://en.wikipedia.org/wiki/UnionFS).

The patent document U.S. Pat. No. 9,152,582 B2 titled "AUTO-CONFIGURATION OF A DOCKED SYSTEM IN A MULTI-OS ENVIRONMENT", by Z124, granted on Oct. 6, 2015, proposes a method to auto-configure multiple Operating Systems (on top of a modified Android Kernel) in a mobile device in order to provide a full desktop experience to the user when it's docked in a secondary terminal environment. The present invention differs from document U.S. Pat. No. 9,152,582 B2 by proposing the usage of existing technologies instead of modifying the Android Kernel. It also improves security when running two containers because it isolates the resources (processes, files, users, memory, etc.) in each container.

The solution called Linux on Galaxy, by Samsung, enables a desktop experience wherein the native Android-based system contains a Linux distribution inside, wherein the Linux functionalities has resource limitations: lack of advanced hardware controls, restricted system user's permissions and resource management constraints. The present invention differs from the solution Linux on galaxy by, rather, presenting a full Linux OS containing Android functionalities in a container, overcoming the cited limitations and providing a complete Linux desktop experience to the user, concurrent with the regular smartphone functionalities.

The solution called Android in a Box, by Anbox, run Android apps in Linux windows seeming like Android operating system is running inside the Linux. The present invention differs from this solution since it brings an Android experience into the Linux environment rather than the opposite as proposed by the solution called Android in Box. Besides, Android in Box solution does not provide isolation between the two operating system environments.

The patent document CN 106095530, titled "MULTI-ANDROID-SYSTEM CONTAINER AUTOMATIC CREATING AND STARTING METHOD", by University of Electronic Science and Technology of China, filed on Jun. 8, 2016, proposes the creation of multiple Android instances in separate containers running on a Linux kernel, similarly, but with a different purpose than proposed by the present invention, i.e., enabling a full desktop experience, running on virtual containers on top of a Linux Kernel, based on physical mobile.

SUMMARY

The system of the present invention enables a full desktop experience from a mobile device (such as smartphones and tablets), while the latter is fully functional. This allows the user to simultaneously use a desktop and a cell phone from the same device, without having to carry a laptop or use a desktop, just by connecting it to a display (e.g. monitor, TV, projector, etc.).

In addition, the present invention enables a full desktop experience running a regular Linux OS distribution with all its capabilities alongside with a Mobile OS. When the device is connected to a bigger screen, by any means (e.g. Dock station, HDMI output, Screen casting through the network, Screen sharing, VNC etc.), the Linux OS is accessible to the user and the Mobile OS also is kept running in the mobile device screen normally with all its functionalities. The OS's access to each other's files and processes can be restricted for security reasons. If necessary, it's possible to share common folders between the OS's to exchange information. There is no need to modify the original Linux Kernel code in order to implement the invention.

BRIEF DESCRIPTION OF DRAWINGS

The objectives and advantages of the current invention will become clearer through the following detailed description of the example and non-limitative drawings presented at the end of this document.

DETAILED DESCRIPTION

Figure 1:
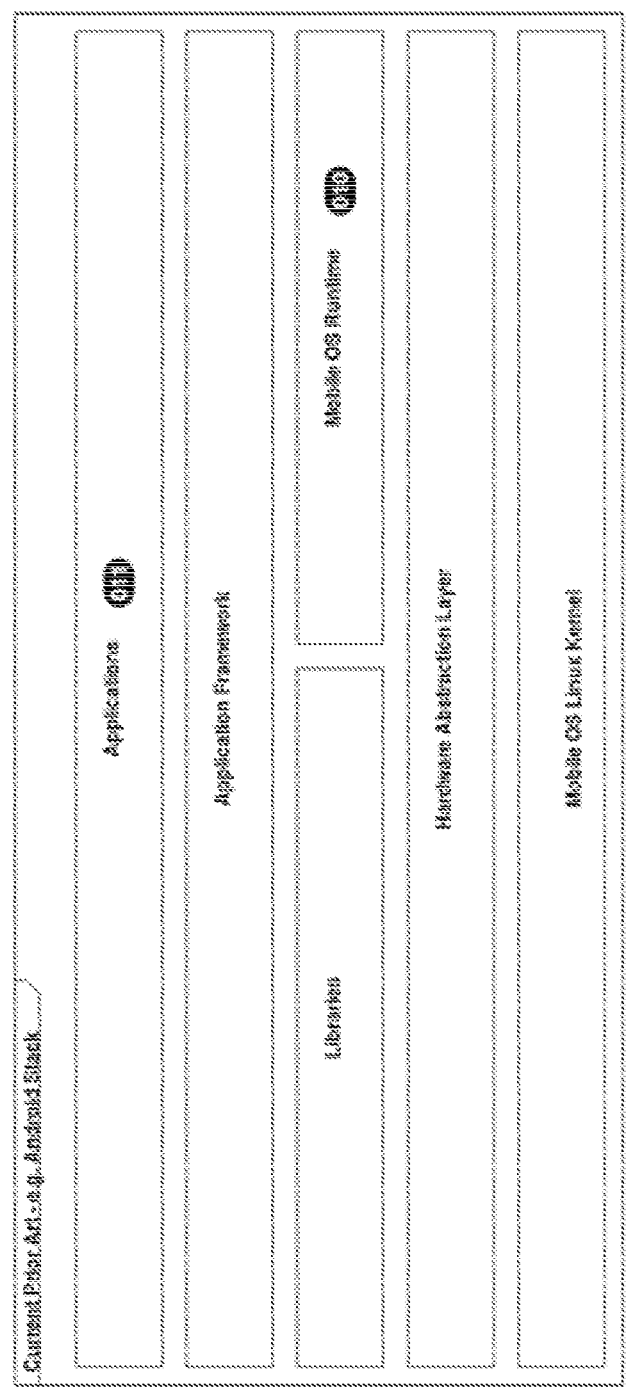
FIG. 1 discloses an example of a standard Mobile OS Architecture enabling a mobile device to behave as a Desktop Workstation.

FIG. 1 discloses the regular Technology Stack Diagram of a Mobile OS of the prior art which includes a lean Linux kernel supporting a mobile OS (e.g. Android) runtime. In order to bring the experience of a Workstation Desktop it alters a couple of layers of that particular stack. It keeps the existing mobile OS layers as in the original architecture. In addition, according to FIG. 1, the reference (010) represents one of the changes in the Mobile OS Runtime Layer that identifies a mobile device connected to a dock station allowing the emulation of a Virtual Desktop environment by the Application Framework. Once a dock connection takes place or video casting stream is detected, the target Applications (011) takes control to emulate a desktop-like environment so that the user has a Workstation experience. Although, this approach presents some limitations: lack of advanced hardware controls, restricted system users permissions and resource management constraints.

Figure 2:
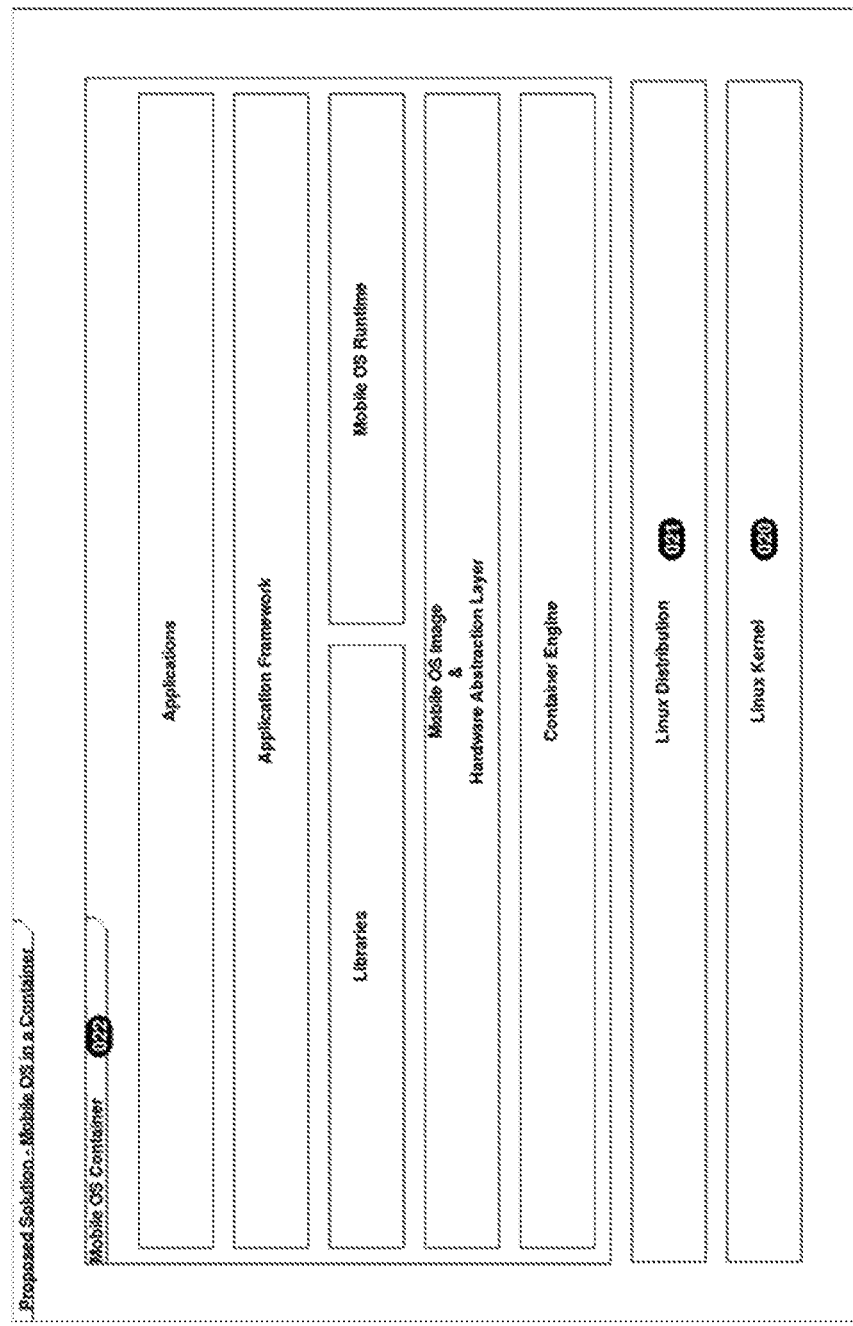
FIG. 2 discloses a diagram in which the Mobile OS is packaged in a virtual container that runs on top of a Standard Linux Distribution.

On FIG. 2, it is disclosed the system of the present invention to bring a full and non-limited Desktop experience, capable of performing any regular Desktop task or activity. The new system comprises a modified technology stack in order to enable a mobile device to behave such as a Workstation computer. Below is described the main components of the system where:

The first two layers represent a Standard Linux Kernel (020) and Linux Distribution (021) such the ones distributed on regular laptops/computers. On the Linux Kernel (020) additional changes are received to support mobile device's hardware. Also, the Linux Distribution (021) is the same Linux Distribution powering computers and laptops worldwide. The Mobile OS Container (022) is a representation of FIG. 1, where the Mobile OS will run on a Virtual Container on top of a regular Linux Distribution. Thus, the layer on (021) provides a full Desktop Experience on top of a mobile device; and the layer on (022) provides a regular Mobile Experience just like as any other smartphone or tablet.

Figure 3:
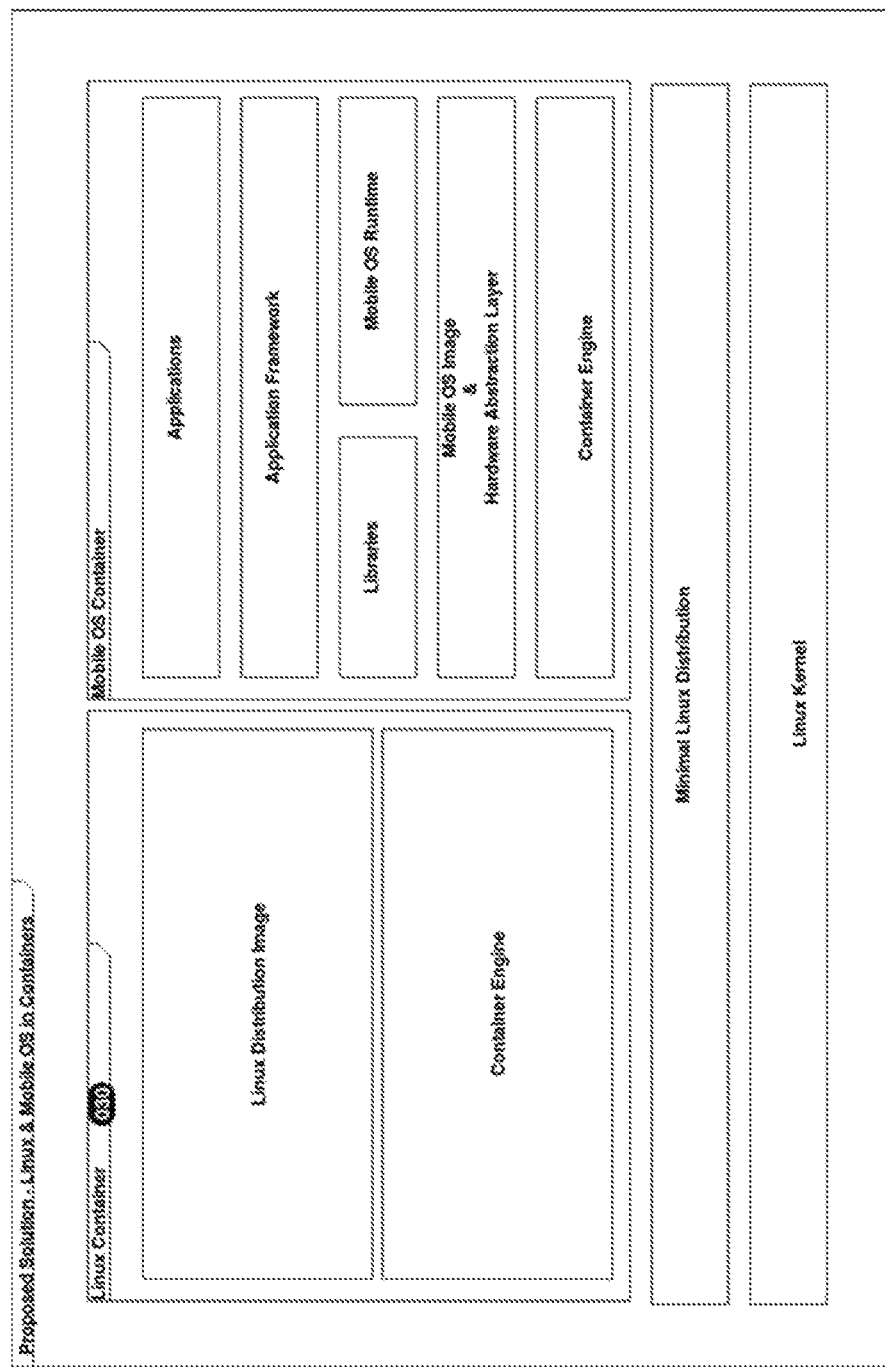
FIG. 3 discloses an alternate approach by packaging the Standard Linux Distribution in a virtual container along with the Mobile OS.

Alternatively, FIG. 3 discloses how the system can be designed to run both experiences, Desktop and Mobile, on its own Virtual Container isolated from each other to prevent the Desktop Container (030) to have authority/control over the Mobile Container. FIG. 3 discloses the concurrent execution of multiple containers on top of a minimalist Linux Distribution, serving to different purposes on the same physical mobile device: act as Desktop and mobile devices simultaneously.

Figure 4:
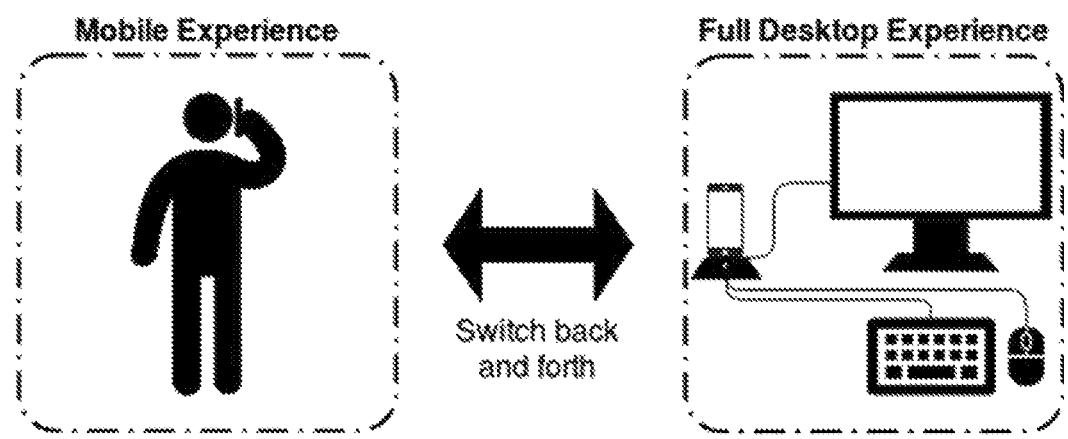
FIG. 4 discloses a current mobile experience in comparison with the new Experience with desktop: example of current available functions on the mobile device on the left side and, the full desktop experience on the right side.

FIG. 4 discloses the same containerization approach as in FIG. 3 but with more than one Desktop containers. It allows multiple users to virtually work at the same time in separated Desktops based on the same physical mobile device.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

The invention claimed is:

1. A system to enable a full Desktop Experience with use of a mobile device, the system comprising:
    a processor to:
        provide a Linux kernel and a Linux distribution including the functionalities of an operating system of the mobile device,
    wherein the operating system of the mobile device is packaged in a virtual container so that full Desktop Experience containing the functionalities of the operating system of the mobile device is presented while the virtual container is running inside the Linux distribution, and the Linux kernel manages both the Linux distribution and the operating system of the mobile device, and
    wherein a Linux operating system is accessible to a user and the operating system of the mobile device is kept running in a screen of the mobile device normally with all the functionalities of the operating system of the mobile device.

2. The system of claim 1, comprising:
    enabling multiple desktop instances wherein multiple instances of Linux operating system distributions are packaged in respective virtual containers.

3. The system of claim 1, wherein the operating systems' access to each other's files and processes is restricted for security reasons.

4. A system to enable a full Desktop Experience with use of a mobile device, the system comprising:
    a processor to:
        provide a Linux kernel and a Linux distribution including functionalities of an operating system of the mobile device,
    wherein a desktop operating system and an operating system of the mobile device run in respective virtual containers isolated from each other so that full Desktop Experience containing the functionalities of the operating system of the mobile device is presented, and the Linux kernel manages both the Linux distribution and the operating system of the mobile device, and wherein a Linux operating system is accessible to a user and the operating system of the mobile device is kept running in a screen of the mobile device normally with all functionalities of the operating system of the mobile device.

5. The system of claim 4, comprising:

enabling multiple desktop instances wherein multiple instances of Linux operating system distributions are packaged in respective virtual containers.

6. The system of claim 4, wherein the operating systems' access to each other's files and processes is restricted for security reasons.

\* \* \* \* \*

UNITED STATES PATENT AND TRADEMARK OFFICE
CERTIFICATE OF CORRECTION

PATENT NO. : 11,385,912 B2
APPLICATION NO. : 16/380382
DATED : July 12, 2022
INVENTOR(S) : Romeu Palos De Gouvea et al.

Page 1 of 1

It is certified that error appears in the above-identified patent and that said Letters Patent is hereby corrected as shown below:

On the Title Page

Column 1, at item (71) Line 2, delete "Sâo Paulo (BR);" and insert --Campinas (BR);--.

Column 1, Line 2, below "Jul. 16, 2020" insert
--(30) Foreign Application Priority Data
Jan. 16, 2019 (BR) 10 2019 000921 7--, as a new field entry.

Signed and Sealed this
Twenty-seventh Day of September, 2022

Katherine Kelly Vidal
*Director of the United States Patent and Trademark Office*